US011113487B2

(12) United States Patent
Maurice et al.

(10) Patent No.: US 11,113,487 B2
(45) Date of Patent: Sep. 7, 2021

(54) SPECTACLE LENS PROVIDED WITH A PERMANENT MARKING

(71) Applicant: ESSILOR INTERNATIONAL, Charenton-le-Pont (FR)

(72) Inventors: Sébastien Maurice, Charenton-le-Pont (FR); Christophe Hubert, Charenton-le-Pont (FR); Stéphane Auffray, Charenton-le-Pont (FR); Daniel Ferreira, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 16/330,955

(22) PCT Filed: Sep. 7, 2017

(86) PCT No.: PCT/EP2017/072423
§ 371 (c)(1),
(2) Date: Mar. 6, 2019

(87) PCT Pub. No.: WO2018/046580
PCT Pub. Date: Mar. 15, 2018

(65) Prior Publication Data
US 2019/0258836 A1 Aug. 22, 2019

(30) Foreign Application Priority Data
Sep. 7, 2016 (EP) .................................... 16306121

(51) Int. Cl.
G06K 7/10 (2006.01)
G02C 7/02 (2006.01)
(Continued)

(52) U.S. Cl.
CPC ......... G06K 7/10722 (2013.01); G02C 7/021 (2013.01); G06K 7/1413 (2013.01); G06K 7/1417 (2013.01); B29D 11/00326 (2013.01)

(58) Field of Classification Search
CPC ............ G06K 7/10122; G06K 7/1413; G06K 7/1417; G02C 7/021
See application file for complete search history.

(56) References Cited

U.S. PATENT DOCUMENTS 4,329,378 A * 5/1982 Tarumi .................. B29D 11/00
351/159.63
6,188,040 B1 2/2001 Darmes et al.
(Continued)

FOREIGN PATENT DOCUMENTS

EP 1454283 10/2007
WO 2014/090883 A1 6/2014

OTHER PUBLICATIONS

International Search Report, dated Dec. 6, 2017, from corresponding PCT/EP2017/072423 application.

Primary Examiner — Thien M Le
Assistant Examiner — Asifa Habib
(74) Attorney, Agent, or Firm — Nixon & Vanderhye

(57) ABSTRACT

A spectacle lens includes a substrate and an anti-reflection or mirror interference coating covering the substrate on the side of the front face, the interference coating forming a one-dimensional or two-dimensional bar code pattern, the marking being formed by a plurality of point holes on a portion of a thickness of the interference coating, the front face having, away from the point holes, a coefficient of reflection of light having a predetermined nominal value and, in each the point hole, a coefficient of reflection of light having a particular predetermined value that is different from the nominal value.

20 Claims, 5 Drawing Sheets

(51) Int. Cl.
*G06K 7/14* (2006.01)
*B29D 11/00* (2006.01)

(56) References Cited

U.S. PATENT DOCUMENTS

| | | | |
|---|---|---|---|
| 9,610,667 B2* | 4/2017 | Samukawa | B23Q 17/2457 |
| 2004/0095645 A1 | 5/2004 | Pellicori et al. | |
| 2009/0302122 A1* | 12/2009 | Begon | G03H 1/02 |
| | | | 235/494 |
| 2010/0102025 A1* | 4/2010 | Eagerton | G02B 1/12 |
| | | | 216/13 |
| 2011/0089585 A1* | 4/2011 | Biel | B29D 11/00317 |
| | | | 264/1.1 |
| 2012/0314186 A1 | 12/2012 | Levraud et al. | |
| 2013/0335694 A1* | 12/2013 | Huang | G02C 7/021 |
| | | | 351/51 |
| 2014/0016083 A1* | 1/2014 | Macionczyk | B23K 15/08 |
| | | | 351/159.6 |
| 2014/0168600 A1* | 6/2014 | Ochrombel | B29D 11/00326 |
| | | | 351/159.02 |
| 2016/0116762 A1* | 4/2016 | Dangelmaier | B29D 11/00961 |
| | | | 235/462.42 |
| 2016/0350566 A1* | 12/2016 | Ye | G06K 7/10732 |
| 2017/0299886 A1* | 10/2017 | Carmon | G02C 7/021 |
| 2018/0162143 A1* | 6/2018 | Biskop | B33Y 80/00 |

* cited by examiner

SPECTACLE LENS PROVIDED WITH A PERMANENT MARKING

FIELD OF THE INVENTION

The invention relates to the marking of spectacle lenses.

TECHNOLOGICAL BACKGROUND

It is known that spectacle lenses are provided with markings which serve to identify them or to delineate notable geometric points useful for their mounting in a spectacle frame.

Certain markings are configured to no longer be present or to be removed when the lens is in place in a spectacle frame, for example yellow ink markings identifying the geometric center or the prism reference point, which are no longer useful once the lens is in place in a spectacle frame.

Other markings are permanent, for example for identifying the manufacturer of the spectacle lens.

OBJECT OF THE INVENTION

The invention is aimed at improving the permanent markings of spectacle lenses, in a simple and convenient manner.

The invention proposes to this effect a spectacle lens provided with a permanent marking, characterized in that said lens comprises a substrate and an anti-reflective or mirror interferential coating covering said substrate on the side of the front face, said interferential coating forming a one-dimensional or two-dimensional barcode pattern, said marking being formed by a plurality of punctual gaps on a part of a thickness of said interferential coating, said front face exhibiting outside of said punctual gaps a coefficient of reflection of light having a predetermined nominal value and in each said punctual gap a coefficient of reflection of light having a predetermined particular value different from said nominal value.

The invention is based on the observation that such a barcode pattern does not necessarily imply an annoyance for the wearer of the spectacles comprising this lens. On the contrary, it is possible, for example by implementing the preferred characteristics set forth hereinafter, to provide the spectacle lens with such a marking which is invisible or in any event almost invisible or not annoying for the wearer, who sees the lens from the side of the rear face.

Indeed, if x denotes the particular value of the reflection coefficient and y the nominal value, the ratio x/y or y/x between these coefficients (which characterize the intensity of the reflections observed when observing the front face) is relatively considerable, for example lying between a factor of 1.5 and a factor of 15, thus leading to considerable contrast and making it readily possible to observe the permanent mark.

On the other hand, in transmission, the transmission is respectively 1-x-a and 1-y-a (a being the absorption); this implying a transmission ratio of (1-x-a)/(1-y-a) or the inverse, this typically leading to having in one zone a given transmission and in another a transmission different from the first by a factor lying between 0.8 and 1.2 i.e. a comparatively unnoticeable difference for the wearer's eye.

The "absorption coefficient" represents the absorption at a wavelength in the visible spectrum, and is defined here as the ratio between the absorbance A and the optical path length L (=A/L) for an electromagnetic beam of given wavelength (here in the visible region) in a given medium. This ratio is expressed in $m^{-1}$ or $cm^{-1}$, in particular according to ISO/CD standard 11551.

The "transmission factor", or the "transmittance" Tv (tau subscript v) corresponds to the fraction of luminous flux which passes through an optical article, as a function of wavelength, illuminated by an illuminant covering at least the whole of the visible spectrum, for example the solar illuminant or the illuminant D65. The factor Tv corresponds to a standardized international definition (ISO standard 13966:1998) and is measured in accordance with ISO standard 8980-3. It is defined in the wavelength range from 380 to 780 nm.

By "reflection coefficient" is meant the amount of light reflected by the surface of an optical article, illuminated by an illuminant covering at least the whole of the visible spectrum, for example the solar illuminant or the illuminant D65. The amount of reflection is preferably measured with a light ray incident on the surface at an angle of 2° or 10°. When this is not specified, the reflection coefficient takes account only of visible light, that is to say light having a wavelength lying between 380 nm and 780 nm, stated otherwise "illuminant D65".

Because the permanent marking is visible from the side of the front face by reflection, the image sensor of a mass-market product such as a smartphone is able to capture the image of this marking in a simple manner.

Because this marking forms a one-dimensional or two-dimensional barcode, the processing of the image thus captured makes it possible to retrieve the content, for example an identifier specific to the spectacle lens, encoded by the one-dimensional or two-dimensional code.

On the basis of this content, it is possible to offer automatic access to on-line resources, for example directly with the smartphone which captured the image of the marking.

The spectacle lens according to the invention is thus able to offer simple and convenient access to on-line resources, while remaining comfortable for the wearer and simple to manufacture and to put in place in a spectacle frame.

According to advantageous characteristics:

said lens is in an edged state so as to have the contour of a predetermined spectacle frame;

said pattern is two-dimensional comprising a plurality of modules juxtaposed in matrix fashion, said plurality of modules comprising, in order to encode an item of information according to a binary language, modules of a first type each formed by a plurality of said punctual gaps and modules of a second type each situated outside of a said punctual gap;

said pattern lies within a square having a side of 2 mm;

each said module exhibits the shape of a square having a side of 90 µm;

said two-dimensional code comprises between 21×21 and 33×33 modules;

said plurality of punctual gaps of which each module is formed is arranged in a matrix comprising a plurality of rows and of columns;

said interferential coating is anti-reflective, said nominal value is less than 1.4% and preferably less than 0.85% and said particular value lies between 8 and 15%;

said interferential coating is mirror, said nominal value lies between 12% and 15% and said particular value lies between 32% and 34%;

said particular value is higher than said nominal value so that said pattern is seen as bright on a dark background, said one-dimensional or two-dimensional barcode comprises over a predetermined extent dark zones and bright zones, and said pattern is formed by the set of dark zones of said code;

said interferential coating is mirror, said nominal value lies between 10% and 15% and said particular value lies between 5% and 10% while being less than the nominal value; and/or said interferential coating is mirror and said pattern is seen as dark on a bright background, said one-dimensional or two-dimensional code comprises over a predetermined extent dark zones and bright zones, and said pattern is formed by the set of dark zones of said code.

The invention also relates to a pair of spectacles comprising at least one lens such as set forth hereinabove.

The invention also relates to a method for reading the marking of a spectacle lens, comprising the step of taking a photograph or video of said pattern, directly on the spectacle lens, and then the step of analyzing said photograph or video so as to retrieve an identifier encoded by said one-dimensional or two-dimensional barcode pattern formed by said marking.

According to advantageous characteristics:

the step of taking a photograph or a video of the pattern is carried out by means of a mass-market portable electronic apparatus configured to communicate wirelessly with a network and comprising an embedded camera or an embedded photographic apparatus, preferably by means of a mobile telephone apparatus, of a smartphone, of an electronic tablet, of spectacles known as "smart" glasses or of a connected photography apparatus;

said method comprises a step of reading said marking so as to retrieve and decode an identifier encoded by said pattern, and then a step of sending over a network a request to a distant server, and then a step of obtaining feedback data returned by a distant server, and a step of displaying data;

according to the type of requester, the feedback data sent by the distant server are different.

The invention also relates to a computerized application configured to be embedded on board a mass-market portable electronic apparatus configured to communicate with a network, which application is configured so that said apparatus undertakes a reading of said marking of a spectacle lens such as set forth hereinabove, the step of retrieving the pattern formed by this marking, the decoding of the retrieved pattern, and then a sending over a network of a request to a distant server, and then a reception of feedback data returned by a distant server, and a displaying of display data as a function of these feedback data.

Advantageously, the application is configured to send a request comprising at least a part of an identifier encoded by the pattern.

BRIEF DESCRIPTION OF THE DRAWINGS

The disclosure of the invention will now be continued via the detailed description of exemplary embodiments, given hereinafter by way of nonlimiting illustration, with reference to the appended drawings. In the latter.

DETAILED DESCRIPTION OF EXEMPLARY EMBODIMENTS

Figure 1:
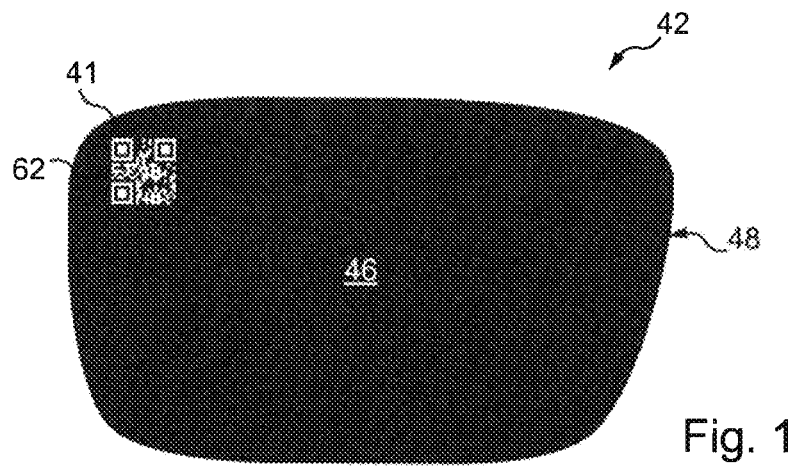
FIG. 1 shows a spectacle lens according to the invention such as seen by an observer situated on the side of the front face of this spectacle lens.

FIG. 1 shows a spectacle lens 42 provided with a marking 41 which forms a two-dimensional code.

The lens 42 exhibits a front face 46, a rear face 47 and a lateral face 48 joining the front 46 and rear 47 optical faces.

The two-dimensional code is here a barcode of the QR code ("Quick Response code") type and encodes as content the series of numerical characters "12345678".

This series of characters is a unique identifier specific to the lens. This identifier will therefore be different for a different lens. Alternatively, in a non-preferred case, the identifier can be unique to a lens pair mounted, or intended to be mounted, on one and the same frame, for one and the same final wearer. This alternative is non-preferred since it is generally useful to differentiate the left lens from the right lens of a spectacle pair, these lenses often having a different optical power and at the minimum a different contour, generally mirroring one another.

The marking 41 is a surface zone engraved on the front face 46 of the spectacle lens, forming a pattern 62 visible to an observer situated on the side of the front face 46 of the lens 42.

The engraving is carried out here by ablation, that is to say by removing a quantity of material, by means of a laser beam.

Figure 2:
FIG. 2 is a view similar to FIG. 1 but with the spectacle lens shown such as seen by an observer situated on the side of the rear face.

As may be noted in FIG. 2, the pattern 62 is not visible for an observer situated on the side of the rear optical face 47 of the lens.

It is of course desirable for the optical properties of the pattern 62 to be such that the pattern 62 is transparent, that is to say that it is not visible or else hardly visible or in any event not annoying for the user. Examples of such properties, in conjunction with the reflection and transmission capabilities, are described subsequently.

By transparent is meant that the pattern 62 does not have any appreciable effect on the local diffusion of the lens. For example, a haze value in a zone comprising the pattern 62 is increased by less than 0.1, preferably by less than 0.05 or even 0.02 relative to a zone of the surface of the lens which does not comprise the pattern 62, when the measured surface area is about 50 or 55 times greater than the surface area occupied by the pattern 62, or alternatively any other equivalent measurement of the diffusion. Furthermore, by transparent, it is also understood that the support does not reduce the transmission value by more than 20% of the transmission value of a part of the lens without said support.

An exemplary method for measuring the impact of the pattern 62 on the diffusion is to measure the haze value in a zone comprising the pattern 62.

The haze value is measured by measuring the light in transmission using for example the Haze-Guard Plus© apparatus from BYK-Gardner according to the procedure of the standard ASTM D1003-00, which is incorporated here in its entirety by reference. All references to "haze" values in this application are according to said standard. The instrument is firstly calibrated according to the manufacturers instructions. Thereafter, the sample is placed on the transmission light beam of the apparatus for pre-calibration and the haze value is recorded.

It is useful to know that for the specific Haze-Guard plus© used by the inventors, the measurement spot used by the Haze-Guard plus© is a spot having a diameter of about 16 mm. By comparison, in the specific embodiments of the invention, used hereinbelow for measuring the haze, the pattern is a square with a side of about 1.9 mm. Thus, what is measured is the impact on the haze value of a matrix of 1.9*1.9 in a zone of surface area Pi $(8)^2$. The ratio of the measured surface area relative to the surface area of the pattern is therefore about 55.

Furthermore, a mean value of transmission in the same zone measured by the Haze-Guard plus© has been made.

According to the measurement methodology explained hereinabove, the following experiment has been carried out:

Lens 1 (polycarbonate substrate with anti-abrasion and antireflection (AR) coatings:

Before engraving the pattern, the haze value measured is 0.17 and the transmission is 97.9%.

After engraving a 1.9*1.9 mm pattern according to the invention, the haze value measured is 0.18 and the transmission 97.9%.

Lens 2 (polycarbonate substrate with anti-abrasion and antireflection coatings):

Before engraving the pattern, the haze value measured is 0.32 and the transmission is 96.8%.

After engraving a 1.9*1.9 mm pattern according to the invention, the haze value measured is 0.32 and the transmission 96.8%.

Lens 3 (substrate of index 1.6 in poly-thio-urethane with with anti-abrasion and antireflection (AR) coatings) engraved with a support which is not in accordance with the invention;

Before engraving the pattern, the haze value measured is 0.23 and the transmission is 97.5%.

After engraving a 1.9*1.9 mm pattern using a laser engraving which locally eliminates all the AR material and removes a part of the anti-abrasion layer, the haze value measured is 0.89 and the transmission 96.9%.

As may be understood, the engraved lens 3 is not in accordance with the invention since the impact of this specific pattern 62 induces too much local diffusion.

Thus, the term transparent, according to the invention, signifies that the impact of the pattern on the haze value, measured for a surface area greater than that of the pattern by a factor of 55, is less than 0.1, preferably less than 0.05, and more preferably less than that 0.02.

The person skilled in the art, knowing the experimental measurements hereinabove, can easily deduce therefrom, using a limited quantity of experiments, a better understanding of the word "transparent" according to the invention, even for protocols for measuring the haze values having a ratio of surface area between the measured surface area and the surface area of the pattern 62 that is very different from that presented hereinabove. Thus, he can get back to haze values when for example, measuring the haze value of the pattern alone, or when measuring haze with a measurement spot 4 mm in diameter and pattern dimensions of 3×3 mm or 2×2 mm.

Figure 9:
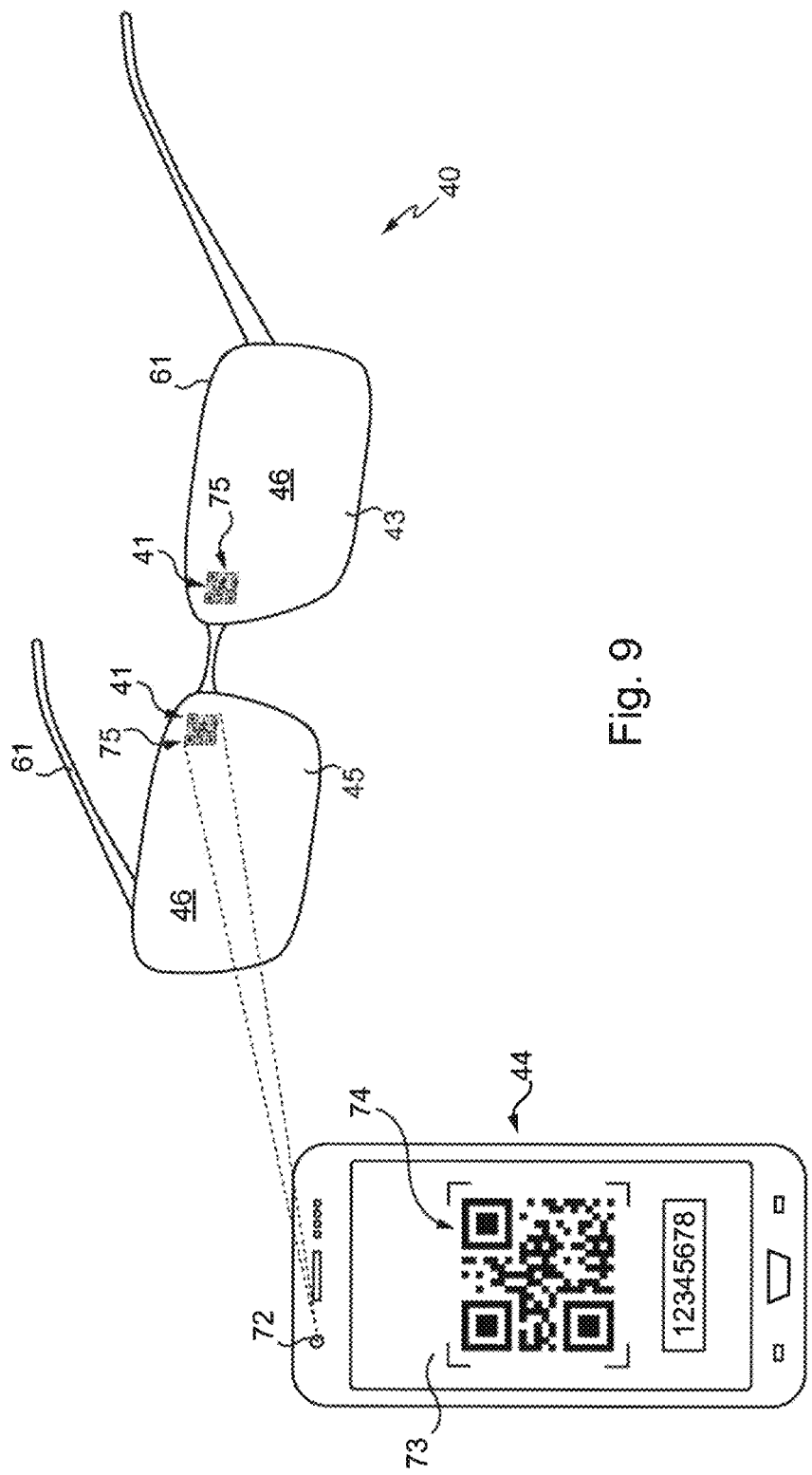
FIG. 9 represents a pair of spectacles equipped with lenses similar to the lens shown in FIG. 8, as well as an electronic portable apparatus configured to take a photograph of the code and analyze the photograph so as to retrieve the code.

The lens 42 shown in FIGS. 1 and 2 has been edged to have the contour of the spectacle frame 61 shown in FIG. 9.

Figure 3:
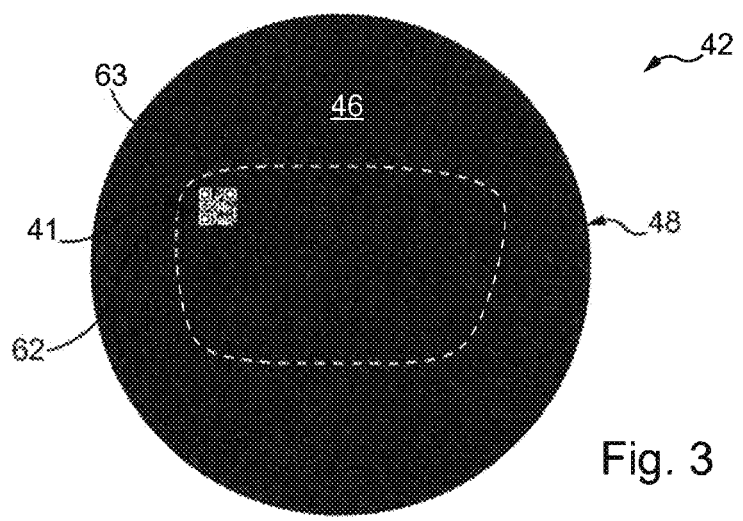
FIG. 3 is a view similar to FIG. 1, but with the lens which is not yet edged.

Before the edging operation, the lens 42 takes the form of a semi-finished lens having a circular contour, as shown in FIG. 3. One of the main faces, for example the front face 46, is finished, whilst the opposite face, here the rear face, is unfinished.

As emerges from FIG. 3, the step of engraving the pattern 62 on the front face 46 of the lens 42 is carried out whilst the lens 42 is not yet edged; and the pattern 62 is engraved in a lens zone selected so as to be present in the lens 42 when it is mounted in a frame such as the frame 61.

As a variant, the pattern 62 is engraved whilst the lens is edged. For example, the unique identifier may have been adjoined to the lens in another form and be transferred onto the lens once edged so as to ensure that the pattern 62 is properly inside the contour of the edged lens. Said other form may for example be a marking on an exterior support, or be on the lens near the outline of the unedged lens, for example by means of a code marking printed with ink, or formed in the same manner as the marking according to the invention.

It will be noted in this regard that in FIG. 3, the dashed line 63 shows the contour of the lens 42 once edged. The pattern 62 is situated inside the zone delimited by the line 63.

The pattern 62 is situated in proximity to the periphery of the edged lens.

The pattern 62 lies within a square having a side of 2 mm.

It will be noted that for convenience of representation the dimensions of the pattern 62 visible in FIGS. 1, 3, 8 and 9 are exaggerated relative to the dimensions of the lens 42.

The structure of the spectacle lens 42 will now be described in greater detail with reference to FIG. 4.

The spectacle lens 42 comprises a substrate 52 and an interferential coating 53 comprising at least two overlaid surface layers, covering the substrate 52 on the side of the front face 46 of the lens 42.

More precisely, the interferential coating 53 comprises successively, from the substrate 52 to the front face 46 of the lens 42, a first layer 64 of metal (chromium, "Cr1"), a second layer 65 of tin dioxide $SnO_2$, a third layer 66 of metal (chromium, "Cr2") and a fourth layer 67 of silica monoxide SiO.

The substrate 52 is here a polarized or tinted substrate comprising a branded anti-scratch coating Mithril®.

The layers 67 (SiO)/66 (Cr2)/65 ($SnO_2$)/64 (Cr1) are of a nature and have a thickness which are such that the coating that they constitute creates an interferential effect increasing the reflections in such a way as to create a mirror with reflection. This coating exhibits a mean reflection coefficient having a nominal value of about 12 to 15%, with a stronger reflection in the violet. The coating is present on the whole, or almost the whole, surface of the front face of the lens, and in particular on the surface immediately facing the eye, when the lens is mounted in a frame and worn by a wearer.

The nature and the physical and optical characteristics of the layers are indicated in the following table:

| Layer number starting from the substrate/Layer reference (illustration) | Material of the layer | Thickness of the layer (±2 nm) |
| --- | --- | --- |
| 1/(64) | Cr | 15 nm |
| 2/(65) | $SnO_2$ | 6 nm |
| 3/(66) | Cr | 5 nm |
| 4/(67) | SiO | 65 nm |

Figure 4:
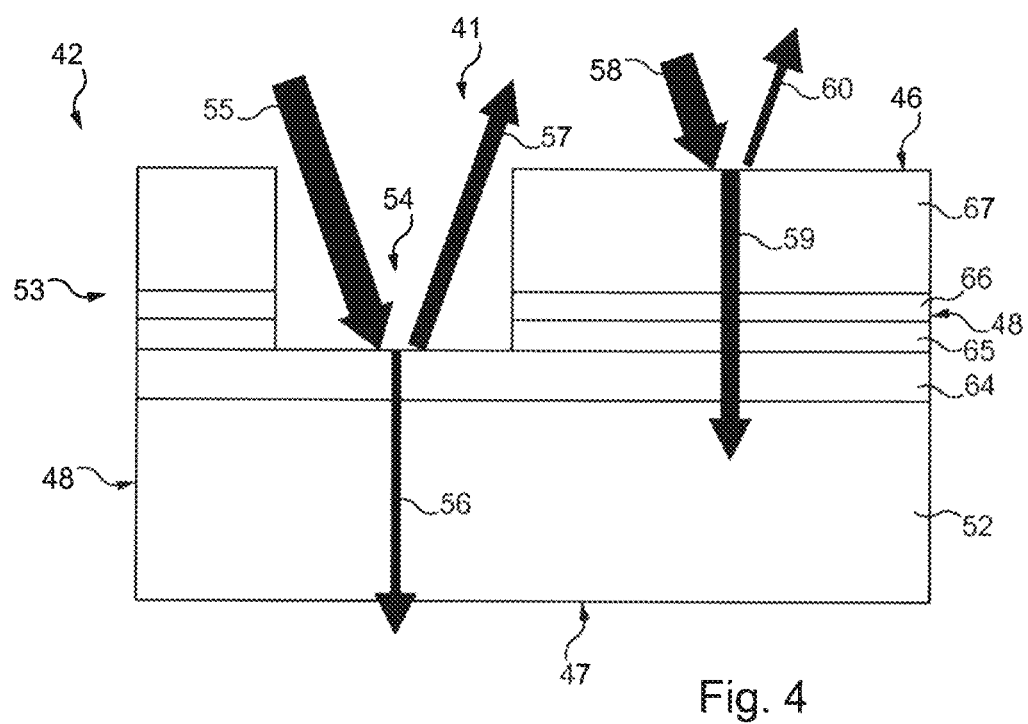
FIG. 4 is a transverse sectional view of the spectacle lens of FIGS. 1 to 3, schematically illustrating the difference in reflection between an engraved zone and an unengraved zone of the front face of this lens.

The pattern 62 is formed by a plurality of punctual gaps 54 of at least one surface layer of the interferential coating 53, just one of these gaps 54 being represented in FIG. 4.

As explained in greater detail hereinafter, these punctual gaps 54 result from the local irradiation of the upper layers of the interferential coating 53 by a laser beam which causes the ablation of some of these layers.

At the level of the gap 54 that can be seen in FIG. 4, the three outermost layers 65, 66 and 67 which make up the coating 53 have been ablated.

Consequently, at the level of the gap 54, the interferential coating 53 is composed of the layer 54 (Cr1), alone, present on the anti-scratch material. This structure causes the lens 42 to have locally a reflection coefficient having a particular value of about 33%, relatively homogeneous according to the wavelengths in the visible.

Thus, the front face 46 exhibits outside the punctual gaps 54 a coefficient of reflection of light having the predetermined nominal value and in each punctual gap 54 a coefficient of reflection of light having the predetermined particular value, which is different from the nominal value.

The local difference between the reflection coefficients is illustrated very schematically in FIG. 4 by arrows 55, 56 and 57 symbolizing respectively the proportions of incident, transmitted and reflected light at the level of a punctual gap 54, and by the arrows 58, 59 and 60 outside of a punctual gap 54.

It will be noted that the reflection coefficient in the punctual gaps 54 forming the pattern 62 is greater than the reflection coefficient outside the punctual gaps 54; or stated otherwise, the particular value is higher than the nominal value.

The pattern 62 therefore appears to an observer situated on the side of the front optical face 46 of the lens 42 as bright on a dark background.

Moreover, the chroma and the tint of the reflection is different.

The pattern 62, that is to say the marking 41 forming the two-dimensional barcode, will now be described in greater detail in support of FIGS. 5 and 6.

As indicated hereinabove, for convenience a pattern similar but not identical to the pattern 62 of FIGS. 1 and 3 has been represented in FIG. 5. For simplicity, this difference is neglected in what follows.

Figure 5:
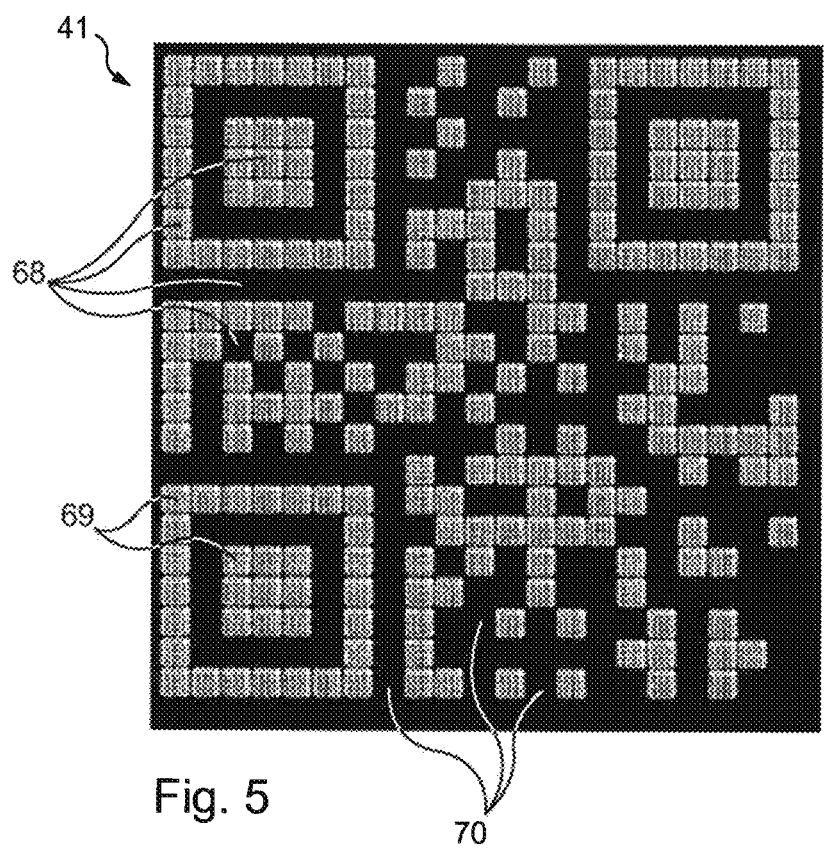
FIG. 5 shows in detail the marking of the lens shown in FIGS. 1 to 3, and more precisely for convenience of representation a similar marking relating to another two-dimensional code, the code of the spectacle lens of FIGS. 1 to 3 and the code of the figure comprising a plurality of modules.

As is clearly visible in FIG. 5, the marking 41 forms a two-dimensional barcode comprising a plurality of modules 68 juxtaposed in matrix fashion.

The plurality of modules 68 comprises, in order to encode an item of information according to a binary language, modules of a first type 69 each formed by a plurality of said punctual gaps 54 and modules of a second type 70 each situated outside of a said punctual gap 54.

The modules of the first type 69 appear here brighter than the patterns of the second type 70.

The two-dimensional code illustrated in FIG. 5 comprises 21×21 modules and encodes the series of numerical characters "99299991".

In a general manner, a two-dimensional code comprising 21×21 modules can encode up to 25 alphanumeric characters.

Each module 68 exhibits the shape of a square having a side of 90 μm.

The pattern 62 therefore forms a square having a side of 90 μm×21=1.890 mm.

Figure 6:
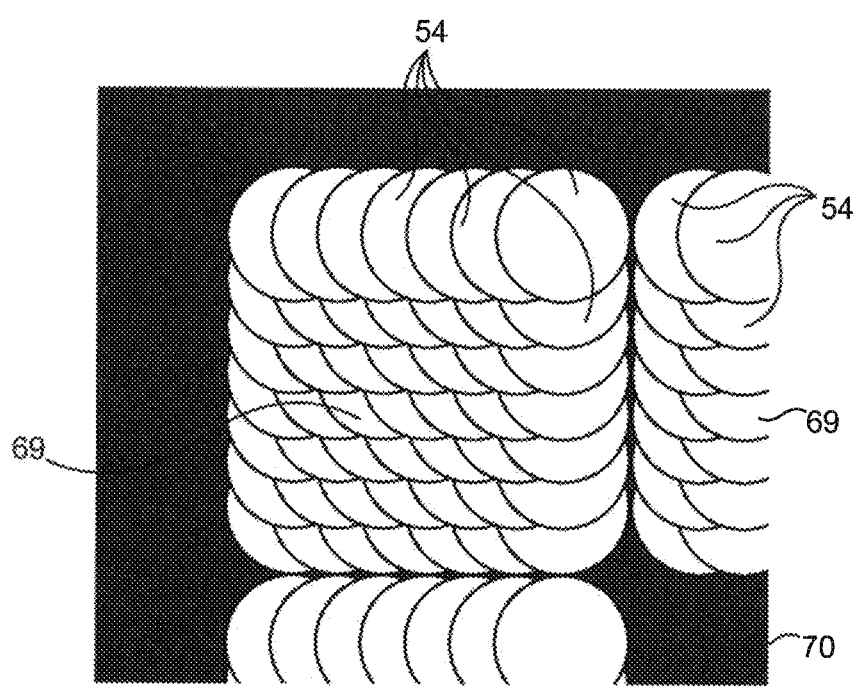
FIG. 6 is a partial magnification of FIG. 5, showing in detail some of the modules forming the two-dimensional code.

As seen in FIG. 6, the plurality of punctual gaps 54 of which each module 68 is formed is arranged in a matrix comprising a plurality of rows and of columns, here seven rows and seven columns.

Each row and each column of a module 68 comprises seven punctual gaps 54. A module 68 is therefore formed here of 49 punctual gaps 54.

To engrave a module, the laser beam successively engraves each row, the rows following one another in a first predetermined direction and in a first predetermined sense.

To engrave a row, the laser beam scans the front surface 46 of the lens 42 in a second predetermined direction perpendicular to the first direction and in a second predetermined sense.

Each row is engraved in this second predetermined sense.

The marking method used to obtain the marking 41 will now be described in greater detail.

It is recalled that the engraving is carried out here by ablation, that is to say by removing a quantity of material, by means of a laser beam.

The marking is thus formed of a plurality of punctual gaps 54, each produced by one or more pulses of the laser.

The marking method is carried out by means of a laser beam marking machine, comprising a laser source configured to emit a laser beam having a determined radiation wavelength known as the marking wavelength.

To produce a punctual gap 54 at a given point, known as the marking point, at least the layer 65 of tin dioxide $SnO_2$ of the interferential coating 53 is irradiated at this marking point by means of the laser beam at the marking wavelength, so as to ablate, at the marking point, the layer 65 of tin dioxide $SnO_2$ over at least a part of its thickness, and any layer situated between the laser source and the layer 65 of tin dioxide $SnO_2$, that is to say the layers 67 (SiO) and 66 (Cr2).

It will be noted that the layer 65 of tin dioxide $SnO_2$ forms here an interior layer 65 which absorbs the marking wavelength in a more considerable manner than the layers 67 (SiO) and 66 (Cr2) which are situated between the laser source and the layer 65 of tin dioxide $SnO_2$.

The marking method therefore makes it possible to carry out at a marking point a localized direct ablation of at least a part of the interior layer and indirect ablation of the layers situated between the electromagnetic source and the interior layer 65.

The marking method therefore advantageously allows the depth of the engraving to be controlled.

Without wishing to be bound by any theory, the applicant thinks that this is due mainly to the fact that the electromagnetic beam succeeds in irradiating the interior layer 65 which is made of material that is very absorbent at the wavelength of the radiation in comparison to the other layers present.

Indeed, each of the layers of material lying between the electromagnetic source and the interior layer 65 is at least partially transparent at the marking wavelength, that is to say that it does not absorb at least in part at this marking wavelength. Preferably, this layer is at least semi-transparent at this marking wavelength, that is to say that it lets through more than half the energy of this marking wavelength.

Consequently, during exposure to the laser beam, this interior layer 65 receives the major part of the energy transmitted and is therefore degraded in a selective manner. Given that the layers lying between the interior layer 65 and the electromagnetic source are generally layers of oxides of very small thickness, the degradation, or indeed the sublimation, of the interior layer 65, in fact unbinds these layers which can thereafter be extracted.

Thus, the laser beam is advantageously aimed at ablating the interior layer 65, and indirectly allows the ablation, usually by detachment, of any layer situated between the electromagnetic source and the interior layer 65. Stated otherwise, the interior layer 65 is destroyed (partially or totally) by the beam, the layers lying between the beam and the interior layer 65 being destroyed/removed by collateral effect of the destruction of the interior layer 65.

The ablation is such that the single punctual gap 54 resulting therefrom generally has a substantially cylindrical shape whose axis is substantially perpendicular to the surface of the interior layer 65 furthest from the substrate 52 before the former is ablated.

It should be noted, however, that the focusing point of the laser is not necessarily situated in the interior layer 65 of the interferential coating 53. For that matter, it is usually away from the latter, typically 1 to 2 mm away from the latter, for example 2 mm above the lens 42.

For further details on the marking method, reference may be made to French patent application number 1656851, filed by the applicant.

To obtain the marking 41, the punctual gaps 54 are engraved successively according to a predetermined marking spacing.

Here, the marking method has been implemented by means of a pulse laser emitting a beam at the wavelength 266 nm with pulses of duration 1 ns, an energy per pulse of 3 µJ and a beam diameter of about 12 µm in diameter.

In a general manner, the marking energy lies between 1 and 3 µJ per pulse.

These parameters make it possible to have relatively low energy consumption.

The choice of a marking spacing of 10 µm for a beam diameter of 12 µm makes it possible to avoid the presence of any non-irradiated (and therefore unmarked) zone within the modules.

In certain alternative embodiments, the diameter of the beam can be 20 µm or 10 µm with the same marking spacing or a different marking spacing.

These parameters make it possible furthermore to obtain a uniform reflection over the whole of the engraved zone.

It will also be noted that the layer 64 of metal (chromium, "Cr1"), lying between the interior layer 65 and the substrate 52, absorbs only slightly or indeed very slightly the light emitted at the wavelength of the laser (266 nm), thereby rendering it practically insensitive to the electromagnetic marking beam.

It is therefore not destroyed by irradiation by the laser beam.

It is therefore possible to superpose the marking points without any risk of over-engraving at the level of the crossover between two marking points. Consequently, the marking method advantageously makes it possible to produce a continuous marking on the surface of the lens, which is homogeneous, with no "pointillistic" effect.

This is favorable to good reading of the pattern 62 forming the barcode by an electronic portable apparatus equipped with an image sensor, such as a smartphone, with which it would be desired to read the code.

In a variant, not illustrated, the lens is an ophthalmic lens consisting of a substrate which is a lens of index 1.5 from the company Essilor International® comprising a branded anti-scratch coating Mithril, on which is overlaid an interferential coating consisting of a coating comprising successively, starting from the varnish present on the substrate, a first zirconium oxide layer $ZrO_2$ (C1), a first silica dioxide layer $SiO_2$ (C2), a second zirconium dioxide layer $ZrO_2$ (C3), a tin dioxide layer $SnO_2$ (C4), or interior layer, a second silica dioxide layer $SiO_2$ (C5), or exterior layer, an anti-smudge layer (C6) (hydrophobic and/or oleophobic), a magnesium difluoride layer $MgF_2$ (C7) of thickness 37 nm and a magnesium oxide layer $MgO$ (C8) a few nanometers in thickness.

Together, the set of layers C1, C2, C3, C4 and C5, without taking account of the respective layers $MgF_2$ (C7) and MgO (C8) which are temporary layers, produces an interferential coating which here is an anti-reflective coating, having layer thicknesses calculated by means of software known to the person skilled in the art (that takes the nature of these layers into consideration) so as to exhibit a total reflection coefficient having a nominal value of less than 1%, for example 0.85% according to the samples measured.

The nature and the physical and optical characteristics of the layers of the interferential coating are indicated in the following table:

| Layer number starting from the substrate/ Layer reference | Material of the layer | Optical index of the layer | Thickness of the layer (±3 nm) |
| --- | --- | --- | --- |
| 1/(C1) | $ZrO_2$ | 2.0038 | 30 nm |
| 2/(C2) | $SiO_2$ | 1.4741 | 40 nm |
| 3/(C3) | $ZrO_2$ | 2.0038 | 60 nm |
| 4/(C4) | $SnO_2$ | 1.8432 | 6 nm |
| 5/(C5) | $SiO_2$ | 1.4741 | 110 nm |

Carrying out the marking method entails local ablation of the exterior layer $SiO_2$ (C5), of the layers C6, C7 and C8, exterior to the exterior layer $SiO_2$ (C5), as well as at least partial ablation of the interior layer C4, of $SnO_2$.

At a marking point, that is to say in a punctual gap, the particular value of the measured reflection is about 8.5%, i.e. about 10 times more than outside a punctual gap, thus making it possible to obtain good contrast.

In a general manner, with a coating of anti-reflective type, a factor of 5 to 15 is observed between the nominal value (outside the punctual gaps) and the particular value (in the punctual gaps).

Still in a general manner, with a coating of anti-reflective type, the nominal value (outside the punctual gaps) is less than 1.4% and the particular value (in the punctual gaps) lies between 8 and 15%.

The particular value of the reflection coefficient is greater than the nominal value, so that in this variant, not illustrated, where the interferential coating is anti-reflective, and likewise for the interferential coating of mirror type illustrated in FIGS. 1 to 6, the pattern appears as bright on a dark background to an observer situated on the side of the front face.

It should be noted that in transmission, the contrast difference is much smaller than in reflection.

Indeed, the nominal value of the transmission coefficient (outside the punctual gaps) is about 98% (99%-1%), while the particular value of the transmission coefficient (at the location of the punctual gaps) lies between about 84% and about 91%, therefore with a factor of between about 0.86 and about 0.92 between the nominal value and the particular value of the transmission coefficient.

Such a factor between the particular and nominal values of the transmission coefficients leads to a hardly noticeable contrast difference for an observer situated on the side of the rear face of the lens, in particular for the wearer of this lens.

Figure 8:
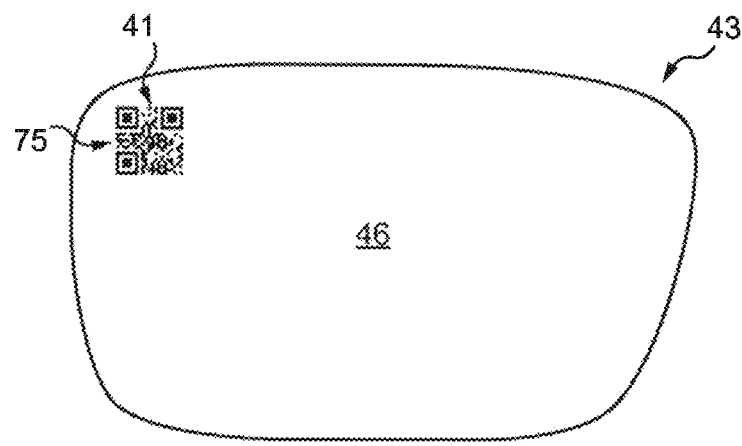
FIG. 8 represents a spectacle lens similar to that shown in FIGS. 1 to 4 but with the marking which is seen as dark on a bright background.

FIGS. 8 and 9 illustrate a variant in which a lens 43 is furnished with a mirror interferential coating and provided with a marking 41 engraved on its front face 46, forming a pattern 75 visible to an observer situated on the side of the front face of the lens 43.

The mean reflection nominal value lies between 10% and 15% and the particular value lies between 5% and 10%, lower than the nominal value. For example lower by at least 3% or preferably by at least 5%.

The particular value of the reflection coefficient is in this case lower than its nominal value, so that the pattern 75 is seen as dark on a bright background.

FIG. 9 represents a pair of spectacles 40 equipped with the lens 43 and with a similar lens 45, as well as a portable electronic apparatus 44 in the process of taking a photograph 74 of the marking and of analyzing the photograph 74 to retrieve the code formed by the marking 41.

The pair of spectacles 40 comprises a frame 61 on which the lenses 43 and 45 are mounted with their rear face turned towards the wearer (not illustrated) of the spectacles, so that the markings 41 are transparent or invisible to the wearer or in any event hardly visible or not annoying.

For each lens 43 and 45, the marking 41 is situated on the nasal side and on the upper side of the lens. As a variant the marking is situated on the temporal side and/or on the lower side of the lens.

The portable electronic apparatus 44 is a smartphone which in a conventional manner comprises a processor, an image sensor 72, a display screen 73 as well as wireless communication members configured to connect to a network such as the Internet.

The portable electronic apparatus 44 is configured to implement a method for reading the marking 41 so as to retrieve the code and then decode it. The decoded information contained in the code is displayed on the screen 73 of the apparatus 44, here the string of numerical characters "12345678".

As indicated hereinabove, this series of characters is a unique identifier specific to the lens 45.

The portable electronic apparatus 44 is configured to intervene in a method where after it has implemented the step of retrieving and decoding this identifier, are implemented a step of sending over a network a request to a distant server, and then a step of obtaining feedback data returned by a distant server, and a step of displaying data.

According to the type of requester, the feedback data sent by the distant server are different.

For example, a computerized application is embedded on board the portable electronic apparatus 44 so as to configure it accordingly, in particular so that the apparatus 44 undertakes a reading of the marking 41, the decoding of the retrieved pattern 75, and then a sending over a network of a request to a distant server, and then a reception of feedback data returned by a distant server, and a displaying of display data as a function of these feedback data.

This application is advantageously configured so that the sent request comprises at least a part of the identifier encoded by the pattern 75.

In a general manner, the two-dimensional code pattern 75 formed by the marking 41 comprises over a predetermined extent dark zones and bright zones.

In a preferential mode, in order to facilitate the reading of the marking 41, the lens is positioned so as to have the face comprising the marking oriented towards a diffuse light source, the portable electronic apparatus is similarly oriented in such a way that its embedded camera is oriented towards the zone comprising the marking, and the lens and the electronic apparatus are thereafter oriented in such a way that the reflection from the diffuse light source on the lens encompasses the marking 41 when seen by the camera of the portable electronic apparatus, thus rendering the marking 41 visible by the camera by reflection of the light.

The diffuse light source can be the exterior light from the sun, directly or through a glass pane, or be another diffuse light source forming a wide reflection on the spectacle lens, in particular a reflection of greater dimension than that of the marking 41.

For each of the lenses 43 and 45 of the pair of spectacles illustrated in FIG. 9, the method for engraving the pattern has been implemented in such a way that the engraved zones, which form the pattern 75, correspond to the dark zones of the two-dimensional code.

Stated otherwise, the pattern 75 is formed by the set of dark zones of the two-dimensional code.

Since the pattern 75 is seen as dark on a bright background, the dark zones of the two-dimensional code correspond to the dark zones of the pattern 75.

Thus, to retrieve the two-dimensional code, the reading method implemented by the smartphone must comprise a step of taking the photograph 74 of the pattern 75, and then a step of analyzing the photograph 74 to detect the dark zones of the pattern 75.

It will be noted that for the spectacle lens 42 illustrated in FIGS. 1 to 3, the engraving method has also been implemented in such a way that the engraved zones, which form the pattern 62, correspond to the dark zones of the two-dimensional code.

Stated otherwise, the pattern 62 is formed by the set of dark zones of the two-dimensional code.

On the other hand, in this case, the pattern 62 is seen, in reflection, as bright on a dark background. Consequently, the dark zones of the two-dimensional code correspond to the bright zones of the pattern 62.

This appearance of a bright pattern on a dark background is related to the fact that in this case, the particular reflection value is more considerable than the nominal value of the unengraved zones. Thus, the engraved zones, which form the pattern 62, are observed, in reflection, as more luminous than the unengraved zones.

It is interesting to note that the colors used to illustrate the figures are not representative of reality and their purpose is merely to illustrate the contrast between the pattern 62 and the remainder of the lens. In practice, if the case illustrated by FIGS. 1 to 3 may apply to solar lenses comprising a mirror coating, or solar lenses having an anti-reflective or mirror coating, lenses which therefore actually look dark, this case also applies to clear lenses having, in the unengraved zones, a transmission value of between 80% and 98%. The transmission value, in the engraved zones, may even be greater than 88% or 93% or indeed even 95% for anti-reflective lenses. The case illustrated by FIGS. 1 to 3, 5 and 6 is in particular one of the preferable embodiments for clear lenses comprising anti-reflective.

Indeed, in the case of these clear lenses, comprising anti-reflective, the nominal value in reflection is less than 1.4%, or indeed less than 1%. A considerable contrast can then be obtained by locally degrading the anti-reflective coating, or indeed by locally transforming the interferential stack into a partial mirror. Indeed, the contrast is then made between a general surface of the lens having almost no reflection and a local pattern identifiable by a more considerable reflection coefficient, by at least a factor of 4, or indeed easily 5 to 15 times as considerable as the nominal value. It should be noted that though the surface of the lens appears dark when the apparatus, for example a smartphone, tries to read the pattern 62, and through the fact that the reading of the pattern is done by reflection, the surface of the lens normally appears bright and transparent. The dark effect of the unengraved zone appears such only by contrast with the pattern 62, but is otherwise a lens seen as clear.

Thus, if the pair of spectacles were equipped with lenses similar to the lens 42, it would be necessary, in order to retrieve the two-dimensional code, for the reading method to comprise an additional step of inverting the contrasts of the photograph 74 taken by the smartphone before being able to detect the pattern 62 and retrieve the two-dimensional code.

The method implemented by the program, the software or the application used by the smartphone to detect the pattern, or by any other equivalent apparatus, for example a tablet or a distant server to which the smartphone sends the image or the photograph, may thus comprise a step of inverting the contrasts, or a step of choosing implementation of said step of inverting the contrasts. This choosing step can thus be implemented after a step of detecting contrasts on the image and a step of detecting a dark pattern on a bright background. Alternatively, the default mode of operation may comprise an inversion of the contrasts and use the image without inversion only when no two-dimensional code is identified in inverted contrast mode.

Figure 7:
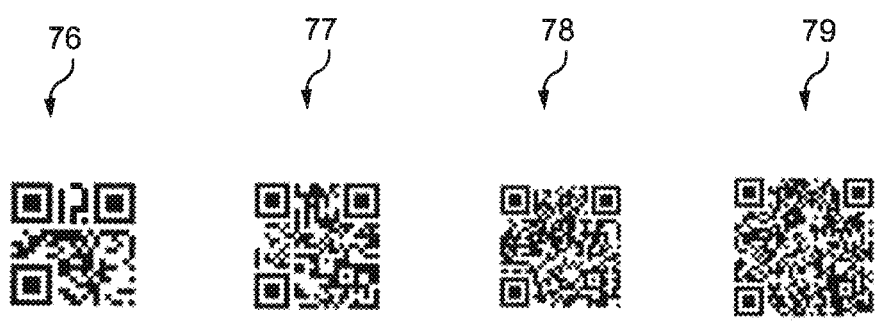
FIG. 7 shows various versions of a two-dimensional code comprising respectively 21×21, 25×25, 29×29 and 33×33 modules.

FIG. 7 shows various versions of a two-dimensional code which can be used to obtain a lens such as the lens 42 or the lenses 43 and 45.

More precisely, FIG. 7 shows from left to right a first version 76, a second version 77, a third version 78 and a fourth version 79; these versions comprising respectively 21×21, 25×25, 29×29 and 33×33 modules.

Each module exhibits the shape of a square having a side of 90 μm.

The 25×25 version therefore forms a square of 90 μm×25=2.250 mm.

The 29×29 version therefore forms a square of 90 μm×29=2.610 mm.

The 33×33 version therefore forms a square of 90 μm×33=2.970 mm.

Alternatively, the pattern may have slightly smaller modules, or fewer of them and form a pattern of about 1.9 mm by 1.9 mm or about 2 mm by 2 mm . . . etc.

To simplify the drawing, the four versions are all shown to the same size in FIG. 7.

In variants which are not illustrated:

the lens is not yet edged to have the contour of a predetermined spectacle frame;

the barcode is one-dimensional, for example a barcode of EAN, Alpha39 or GS1 type;

the two-dimensional code is not a QR code but a two-dimensional code of another type, for example a code of DataMatrix, Aztek, MaxiCode or High Capacity Color Barcode type;

the code encodes information different from a unique identifier specific to the lens, for example optical characteristics of the lens and/or geometric parameters;

the structure of the mirror interferential coating is different;

the structure of the anti-reflective interferential coating is different and corresponds for example to the structure set forth in the following table:

| Layer number starting from the substrate | Material of the layer | Optical index of the layer | Thickness of the layer (±3 nm) |
|---|---|---|---|
| 1 | $SiO_2$ | 1.4658 | 150 nm |
| 2 | $ZrO_2$ | 2.0038 | 20 nm |
| 3 | $SiO_2$ | 1.4741 | 20 nm |
| 4 | $ZrO_2$ | 2.0038 | 100 nm |
| 5 | $SnO_2$ | 1.8432 | 6 nm |
| 6 | $SiO_2$ | 1.4741 | 75 nm | with a nominal value of the reflection coefficient of less than 1%, for example 0.7% or 0.8%, and a particular value of close to 10%, more precisely between 9.5%, and 10.5%, after total ablation of the layer 6 and at least partial ablation of the layer 5 in the punctual gaps;

the portable electronic apparatus is configured to implement a video of the pattern rather than a photograph;

the portable electronic apparatus is different from a smartphone, for example another mass-market portable apparatus configured to communicate wirelessly with a network such as a mobile telephone apparatus, an electronic tablet, spectacles known as "smart" glasses and/or a connected photography apparatus, or even a laptop computer provided with an embedded camera and with a network communication mode, such as WIFI or wired; this may also be one of these said apparatuses, connected indirectly to a network, for example through wireless communication to a server, a computer, or a relay, and wired or wireless communication between said server, computer or relay and the network; and/or the network may be a company internal network, or more particularly a wide area, or indeed worldwide, network such as the Internet network.

Numerous other variants are possible as a function of circumstances, and it is recalled in this regard that the invention is not limited to the examples described and represented.

The invention claimed is:

1. A spectacle lens provided with a permanent marking, said lens comprising:
   a substrate; and
   an anti-reflective interferential or mirror interferential coating covering said substrate on the side of a front face of the spectacle lens, said anti-reflective interferential or mirror interferential coating forming a two-dimensional barcode pattern, said marking being formed by a plurality of punctual gaps on a part of a thickness of said anti-reflective interferential or mirror interferential coating, said front face exhibiting outside of said punctual gaps a coefficient of reflection of light having a predetermined nominal value and in each said punctual gap a coefficient of reflection of light having a predetermined particular value different from said nominal value,
   wherein the two-dimensional barcode pattern is one of a Quick Response (QR) code, a DataMatrix code, an Aztek code, a MaxiCode, and a High Capacity Color Barcode, and
   wherein said two-dimensional barcode pattern comprises a plurality of modules juxtaposed in matrix fashion, said plurality of modules comprising, in order to encode an item of information as claimed in a binary language, modules of a first type and modules of a second type, each of the modules of the first type being formed by a plurality of the punctual gaps, each of the modules of the second type being situated outside of said punctual gap.

2. The spectacle lens as claimed in claim 1, wherein the spectacle lens is in an edged state to have a contour of a predetermined spectacle frame.

3. The spectacle lens as claimed in claim 1, wherein said barcode pattern lies within a square having a side of 2 mm.

4. The spectacle lens as claimed in claim 3, wherein each of said modules exhibits the shape of a square having a side of 90 μm.

5. The spectacle lens as claimed in claim 3, wherein said two-dimensional code comprises between 21×21 and 33×33 modules.

6. The spectacle lens as claimed in claim 1, wherein said plurality of punctual gaps of which each of the modules is formed is arranged in a matrix comprising a plurality of rows and of columns.

7. The spectacle lens as claimed in claim 1, wherein said anti-reflective interferential or mirror interferential coating is anti-reflective, said nominal value being less than 1.4%.

8. The spectacle lens as claimed in claim 1, wherein said anti-reflective interferential or mirror interferential coating is a mirror,
said nominal value lies between 12% and 15%, and
said particular value lies between 32% and 34%.

9. The spectacle lens as claimed in claim 1, wherein said particular value is higher than said nominal value so that said barcode pattern is seen as bright on a dark background, said two-dimensional barcode pattern comprises over a predetermined extent dark zones and bright zones, and said barcode pattern is formed by the set of dark zones of said code.

10. The spectacle lens as claimed in claim 1, wherein said anti-reflective interferential or mirror interferential coating is a mirror, said nominal value lies between 10% and 15%, and said particular value lies between 5% and 10% and less than the nominal value.

11. The spectacle lens as claimed in claim 1, wherein said anti-reflective interferential or mirror interferential coating is a mirror and said barcode pattern is seen as dark on a bright background, said two-dimensional barcode pattern comprises over a predetermined extent dark zones and bright zones, and said barcode pattern is formed by the set of dark zones of said code.

12. A pair of spectacles comprising:
at least one of the spectacle lens as claimed in claim 1.

13. A method for reading the marking of the spectacle lens as claimed in claim 1, the method comprising:
taking a photograph or video of said barcode pattern, directly on the spectacle lens; and
analyzing said taken photograph or video to retrieve an identifier encoded by said two-dimensional barcode pattern formed by said marking.

14. The method as claimed in claim 13, wherein the taking the photograph or the video of the barcode pattern is carried out by a mass-market portable electronic apparatus configured to communicate wirelessly with a network and comprising an embedded camera or an embedded photographic apparatus.

15. The method as claimed in claim 13, further comprising:
reading said marking to retrieve and decode an identifier encoded by said barcode pattern;
sending a request by a requester over a network to a distant server after reading the marking;
obtaining feedback data returned by the distant server; and
displaying data.

16. The method as claimed in claim 15, wherein the feedback data sent by the distant server are different depending on a type of the requester.

17. The spectacle lens as claimed in claim 1, wherein said anti-reflective interferential or mirror interferential coating is anti-reflective, and said nominal value is less than 0.85%.

18. A computerized application configured to be embedded on board a mass-market portable electronic apparatus configured to communicate with a network, wherein the application is configured so that said apparatus undertakes a reading of said marking of the spectacle lens as claimed in claim 1, the pattern formed by the marking is retrieved, the retrieved pattern is decoded, a request is sent over a network to a distant server, feedback data returned by the distant server is received, and display data is displayed as a function of the feedback data.

19. The application as claimed in claim 18, wherein the application is configured to send the request comprising at least a part of an identifier encoded by the barcode pattern.

20. A spectacle lens provided with a permanent marking, said lens comprising:
a substrate; and
an anti-reflective interferential or mirror interferential coating covering said substrate on the side of a front face of the spectacle lens, said anti-reflective interferential or mirror interferential coating forming a one-dimensional barcode pattern, said marking being formed by a plurality of punctual gaps on a part of a thickness of said anti-reflective interferential or mirror interferential coating, said front face exhibiting outside of said punctual gaps a coefficient of reflection of light having a predetermined nominal value and in each said punctual gap a coefficient of reflection of light having a predetermined particular value different from said nominal value,
wherein the one-dimensional barcode pattern is one of an EAN code, an Alpha39 code, and a GS1 code, and
wherein said one-dimensional barcode pattern comprises a plurality of modules juxtaposed in matrix fashion, said plurality of modules comprising, in order to encode an item of information as claimed in a binary language, modules of a first type and modules of a second type, each of the modules of the first type being formed by a plurality of the punctual gaps, each of the modules of the second type being situated outside of said punctual gap.

* * * * *